United States Patent
Kang et al.

(10) Patent No.: US 10,935,800 B2
(45) Date of Patent: Mar. 2, 2021

(54) LIGHT SPREADING COMPLEX LENS

(71) Applicants: Hyundai Motor Company, Seoul (KR); Kia Motors Corporation, Seoul (KR); LP Electronics Co., Ltd., Seoul (KR)

(72) Inventors: Chan Hee Kang, Gyeonggi-do (KR); Seok Jun Kim, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 153 days.

(21) Appl. No.: 16/172,804

(22) Filed: Oct. 28, 2018

(65) Prior Publication Data

US 2019/0179157 A1    Jun. 13, 2019

(30) Foreign Application Priority Data

Dec. 12, 2017 (KR) ........................ 10-2017-0170390

(51) Int. Cl.
| | |
|---|---|
| G02B 3/08 | (2006.01) |
| G02B 27/09 | (2006.01) |
| G02B 7/04 | (2021.01) |
| F21S 43/239 | (2018.01) |
| F21V 8/00 | (2006.01) |
| F21S 43/14 | (2018.01) |
| F21S 43/15 | (2018.01) |
| F21S 43/249 | (2018.01) |
| F21S 43/243 | (2018.01) |

(52) U.S. Cl.
CPC .......... *G02B 27/0955* (2013.01); *F21S 43/14* (2018.01); *F21S 43/15* (2018.01); *F21S 43/239* (2018.01); *F21S 43/243* (2018.01); *F21S 43/249* (2018.01); *G02B 6/002* (2013.01); *G02B 6/0016* (2013.01); *G02B 6/0068* (2013.01); *G02B 7/04* (2013.01)

(58) Field of Classification Search
CPC .. G02B 27/0955; G02B 6/0016; G02B 6/002; G02B 6/0068; G02B 7/04; F21S 43/249; F21S 43/14; F21S 43/243; F21S 43/239; F21S 43/15
USPC ................................ 359/741, 796, 798–800
See application file for complete search history.

(56) References Cited

U.S. PATENT DOCUMENTS

2003/0235047 A1    12/2003    Choi et al.

FOREIGN PATENT DOCUMENTS

| CN | 102767784 A | 11/2012 |
|---|---|---|
| DE | 102011090197 A1 | 7/2013 |
| EP | 2012056 A1 | 1/2009 |
| EP | 2677237 A2 | 12/2013 |

(Continued)

OTHER PUBLICATIONS

European Search Report for European Patent Application No. 18203442, dated Feb. 14, 2019, 9 pages.

*Primary Examiner* — William Choi
(74) *Attorney, Agent, or Firm* — Mintz Levin Cohn Ferris Glovsky and Popeo, P.C.; Peter F. Corless

(57) ABSTRACT

A light spreading complex lens through which light is irradiated and transmitted from a rear side toward a front side of the lens is provided. The lens includes a main body that has a predetermined thickness and is formed with an aperture that is penetrated in a vertical direction. A refraction lens part protrudes toward the rear side of the lens from a first surface near to the front side of the lens in the inner surfaces of the aperture.

11 Claims, 14 Drawing Sheets

(56) References Cited

FOREIGN PATENT DOCUMENTS

| | | |
|---|---|---|
| EP | 3018401 A1 | 5/2016 |
| JP | 2004-163872 A | 6/2004 |

| | SIMULATION |
|---|---|
| 3 |  |
| 4 |  |
| 5 |  |
| 6 |  |
| 7 |  |
| 8 |  |
| 10 |  |
| 12 |  |

# LIGHT SPREADING COMPLEX LENS

CROSS-REFERENCE TO RELATED APPLICATION

This application claims priority to and the benefit of Korean Patent Application No. 10-2017-0170390 filed on Dec. 12, 2017, the entire contents of which are incorporated herein by reference.

BACKGROUND

(a) Field of the Invention

The present invention relates to a light spreading complex lens, and more particularly, to a light spreading complex lens that provides a line light source through a complex lens part even though using a point light source of light emitting diode (LED).

(b) Description of the Related Art

Conventionally, a light spreading material and a part thereof have been used to accomplish a lamp line lightening. However, the developed material has a complex structure for accomplishing a light lightening. Therefore, the present invention provides a line lightening designed by accomplishing a complex lens including a light guiding function (bright enhancement) and a spreading function (line lightening accomplishment).

SUMMARY

One aspect of the present invention provides a light spreading complex lens that provides a line light source through a complex lens part even though a point light source of LED is employed. A light spreading complex lens according to an exemplary embodiment of the present invention in which light is irradiated and transmitted from a rear side toward a front side, may include a main body having a predetermined thickness and formed with an aperture penetrated along with a vertical direction; and a refraction lens part that protrudes toward the rear side from a first surface near to the front side in inner surfaces of the aperture.

A plurality of apertures may be arranged from one side to the other side. A barrier rib may be disposed between any one aperture an adjacent aperture among the plurality of apertures. The barrier rib has a width that gradually decreases toward the front side. A ratio of the width at a front end of the barrier rib to a thickness of the main body may be less than about 0.3.

The lens may further include a serration part that has a plurality of protruding parts that extend toward the front side to a second surface near to the rear side in the inner surfaces of the aperture. The protruding part may extend in a triangular shape when viewed from a top down. The protruding part may satisfy Equation 1.

$$0.375 < h/p < 0.5 \qquad \text{Equation 1}$$

In Equation 1, h is a length of from the second surface to an apex of the protruding part and p is a length of a base line of the protruding part.

The light spreading complex lens may further include a focusing lens part formed along with a rear end of the main body and protruding toward the rear side from the rear surface of the main body. The focusing lens part may extend in a circular arc shape when viewed from a side direction. A ratio of a radius of the focusing lens part to a thickness of the main body may be less than about 0.6. The refraction lens part may extend in a circular arc shape when viewed from a top down. A ratio of a radius of the refraction lens part to a thickness of the main body may be greater than about 3 and less than about 10.

The main body may have a curved shape in which both ends are directed toward a down side, and the center is directed toward an upside. The main body may have a shape in which a length of the front end is greater than a length of the rear end, and the rear end and the front end of the main body may be formed in a circular arc shape based on an imaginary center point disposed in the rear side of the main body. The light spreading complex lens according to an exemplary embodiment of the present invention may enhance an esthetic value by providing a line light source through a complex lens part even using a point light source of LED, thus creating a higher value added on a design. In addition, the material cost may be saved by providing a uniform line light source without using an additional material such as a diffusion plate.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Figure 1:
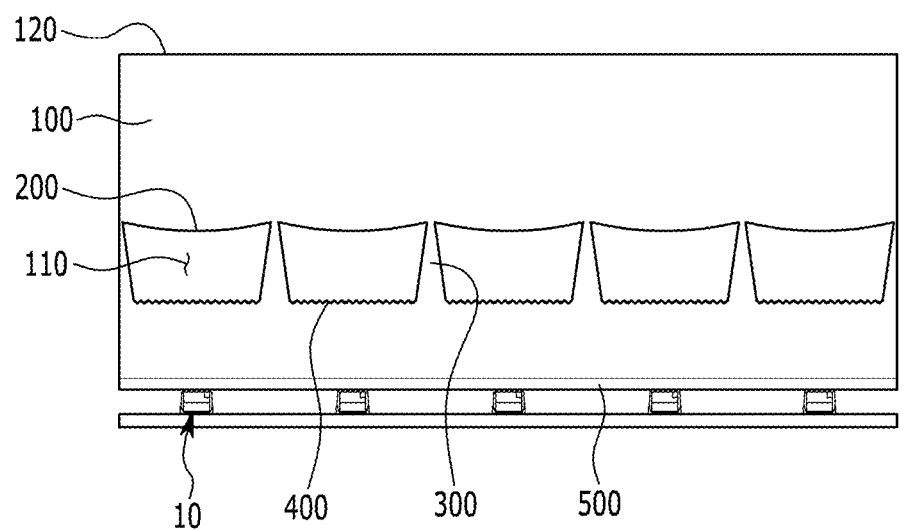
FIG. 1 is a view showing a light spreading complex lens according to an exemplary embodiment of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings so that a skilled person in the technical field to which the present invention pertains may easily carry out the exemplary embodiments. However, this disclosure may be embodied in many different forms and is not construed as limited to the exemplary embodiments set forth herein.

A part irrelevant to the description will be omitted to clearly describe the present invention, and the same or similar constituent elements will be designated by the same reference numerals throughout the specification. The size and thickness of each constituent element as shown in the drawings are randomly indicated for better understanding and ease of description, and this disclosure is not necessarily limited to as shown. In the drawings, the thickness of layers, films, panels, regions, etc., are exaggerated for clarity. Furthermore, the thicknesses of parts of layers, films, regions, etc., are exaggerated for clarity.

In addition, it will be understood that when an element such as a layer, film, region, or substrate is referred to as being "on" another element, it can be directly on the other element or intervening elements may also be present. In contrast, when an element is referred to as being "directly on" another element, there are no intervening elements present. In addition, it will be understood that when an element is referred to as being "upper" or "on" another reference element, it can be disposed on or under the reference element, but it is not necessary that it is "upper" or "on" in a direction opposing the force of gravity. In addition, the word "plane" will be understood to imply the case when the subjected is viewed from above, and the word "cross-section" will be understood to imply the case when the cross-sectional surface vertically cutting the subjected is viewed from the side.

Light Spreading Complex Lens

Figure 2:
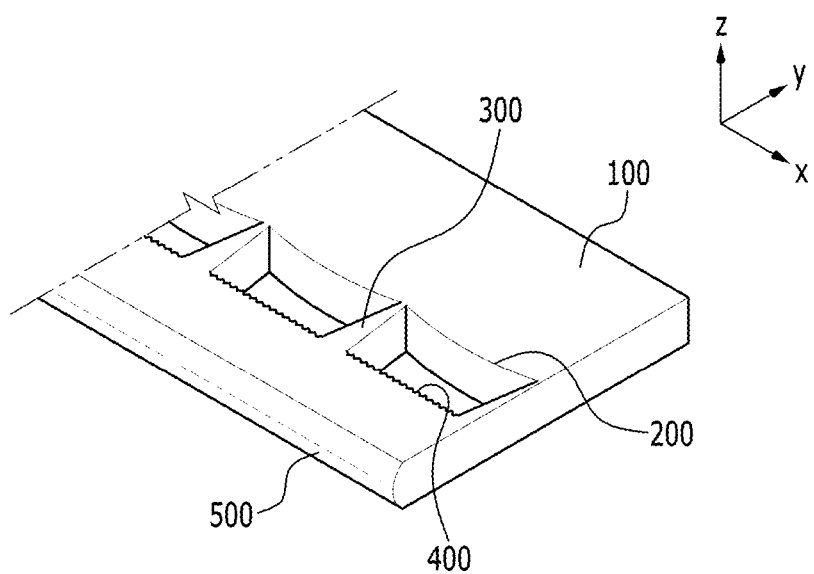
FIG. 2 is a view showing how light is spread through a light spreading complex lens according to an exemplary embodiment of the present invention.
Figure 3:
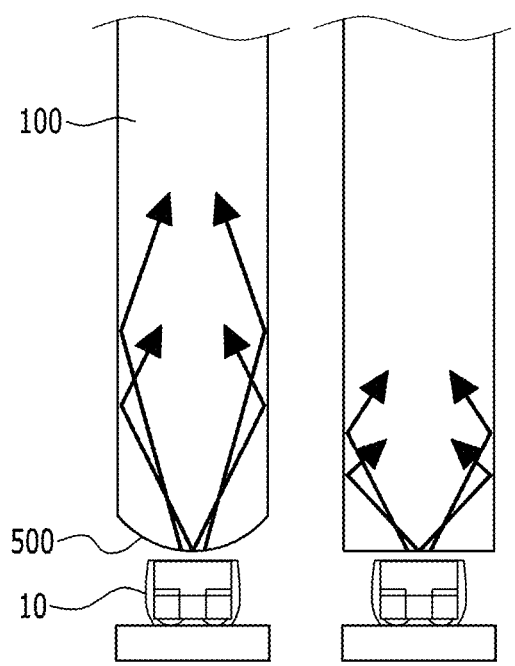
FIG. 3 is a view showing a light spreading complex lens according to an exemplary embodiment of the present invention.

As shown in FIGS. 1 to 3, a light spreading complex lens according to an exemplary embodiment of the present invention that light is irradiated and transmitted from a rear side to a front side, may include a main body 100 having a predetermined thickness and formed with an aperture 110 penetrated in a vertical direction and a refraction lens part 200 that protrudes (e.g., extends) toward the rear side from a first surface proximate to the front side among inner surfaces of the aperture 110.

Light irradiated from a light emitting diode (LED) disposed in the rear side may be transmitted through the light spreading complex lens and emitted to the front side. The point light source 10 of LED may become a line light source through the light spreading complex lens. Accordingly, how bright light is transmitted in a high uniformity may be an important performance of the light spreading complex lens. The main body 100 may have a predetermined thickness and may be formed of a transparent material to allow the light to be transmitted therethrough. The transparency indicates a state in which light may be transmitted, and as the transmittance of light is not limited, a semi-transparency may be pertaining to a scope of 'transparency' in the present invention.

The aperture 110 penetrated in a vertical direction may be formed in the main body 100. The vertical direction refers to a direction parallel to a z-axis with reference to FIG. 2. Specifically, the aperture 110 may be formed in a quadrangle when viewed from the top side (e.g., a bird's eye view or top down view). Inner surfaces of the aperture 110 may have a total of four surfaces including a first surface proximate to the front side, a second surface proximate to the rear side, and a pair of sides that connect both ends of the first surface and the second surface. The front-and-rear direction may refer to a direction parallel to a y-axis shown in FIG. 2. The both side direction refers to a direction parallel to an x-axis.

Further, the refraction lens part 200 may be configured to diffuse light irradiated from a point light source 10. In other words, by forming the refraction lens part 200, light on a light emitting surface 120 where is a front surface of the main body 100 may be emitted as a line light source. The refraction lens part 200 may be formed in a shape that protrudes from the first surface to the back side. Specifically, the refraction lens part 200 may be formed by the same transparent material as the main body 100 and may be integrated with the main body 100.

In particular, the main body 100 and the refraction lens part 200 may be integrated and simultaneously formed by an injection molding of a plastic material in a mold, when fabricating a light spreading complex lens according to an exemplary embodiment of the present invention. The refraction lens part 200 may protrude in a circular arc shape when viewed from the top. More specifically, a ratio of a radius of the refraction lens part 200 to a thickness of the main body 100 may be greater than about 3 and less than about 10. When the main body 100 has a thickness of about 5 mm, the radius of the refraction lens part 200 may be greater than about 15R and less than about 50R.

When the ratio of the radius of the refraction lens part 200 to the thickness of the main body 100 is less than or equal to about 3, light excessively refracted to be converted to a line light source and thus, the light is refracted insufficiently. Accordingly, the light is insufficiently converted to a line light source. However, when the ratio of the radius of refraction lens part 200 to the thickness of the main body 100 is greater than about 10, the radius of the refracted lens is too large to refract light. Accordingly, light may be insufficiently converted to a line light source. In the light spreading complex lens according to an exemplary embodiment of the present invention, a plurality of apertures 110 may be arranged from a first side to a second side (e.g., from one side to another), and a barrier rib 300 may be disposed between any one aperture 110 (e.g., a first aperture) and an adjacent aperture 110 (e.g., a second aperture) among the plurality of apertures 110.

As shown in FIG. 1, a plurality of apertures 110 may be arranged in parallel from one side to the other side. Each aperture 110 may be formed with a refraction lens part 200 corresponding thereto. In addition, the apertures 110 may be formed in the same number as the number of the point light source 10 disposed in the rear side of the main body 100. For example, when the number of the point light sources 10 is five, the number of the apertures 110 may be also five, and a refraction lens part 200 may be formed in the inner surface of each aperture 110.

Furthermore, a barrier rib 300 may be formed between any one aperture 110 and the adjacent aperture 110 (e.g., between adjacent apertures or between a first aperture and a second aperture). In particular, the barrier rib 300 may be formed out of a transparent material which is the same as the main body 100 and may also be integrated with the main body 100. The main body 100 and the barrier rib 300 may be integrated and simultaneously molded by an injection molding of a plastic material in a mold when fabricating a light spreading complex lens according to an exemplary embodiment of the present invention. The barrier rib 300 may be formed in a shape having a width that gradually decreases towards the front side. More specifically, a ratio of a width at the front end of the barrier rib 300 to the thickness of the main body 100 may be less than about 0.3. When the thickness of the main body 100 is about 5 mm, the width at the front end of the barrier rib 300 may be less than about 1.5 mm.

Figure 4:
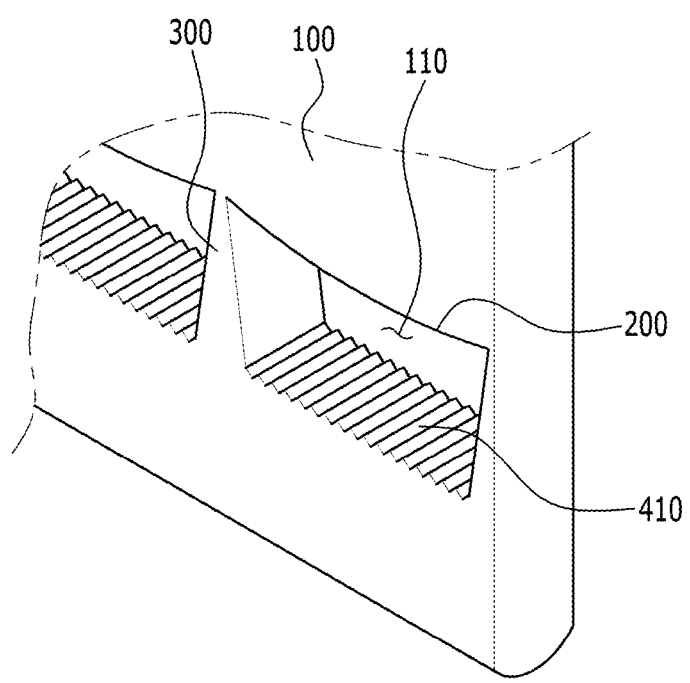
FIG. 4 is a view showing a serration part of a light spreading complex lens according to an exemplary embodiment of the present invention.

When the ratio of the width at the front end of the barrier rib 300 to the thickness of the main body 100 is greater than or equal to about 0.3, the light emission may be limited by the barrier rib 300, and thus, the light may be insufficiently converted into a line light source. The light spreading complex lens according to an exemplary embodiment of the present invention may further include a serration part 400 having a plurality of protruding parts 410 that extend from a second surface near to the rear side toward the front side in the inner surface of the aperture 110. The serration part 400 may be formed to have a uniform pattern along with the second surface, as shown in FIG. 4. Each protruding part 410 for the serration part 400 may be formed in a shape that protrudes toward the front side from the second surface of the aperture 110. The serration part 400 may be configured to diffuse light irradiated from the point light source 10 to a right and left width direction.

Figure 5:
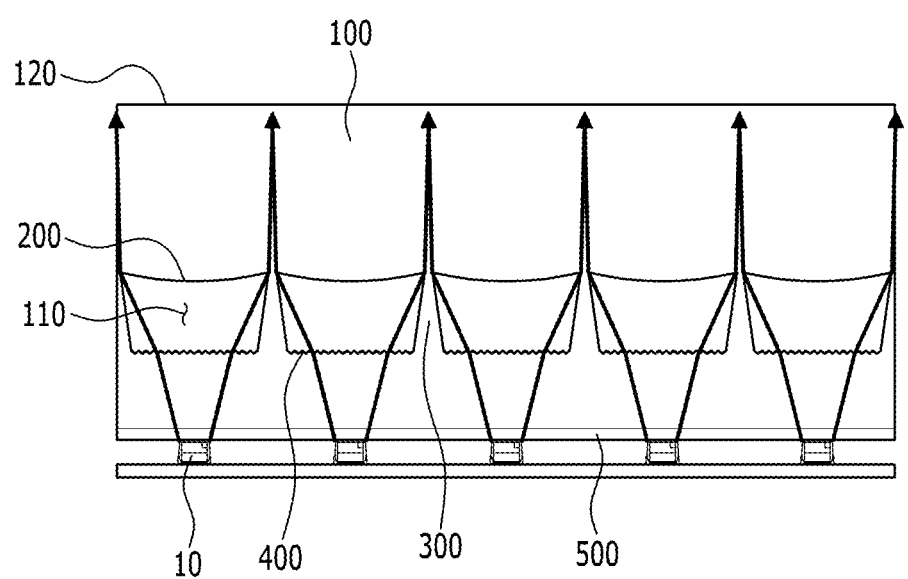
FIG. 5 is a view showing a triangle serration part of a light spreading complex lens according to an exemplary embodiment of the present invention.

In particular, the serration part 400 may be formed by the same transparent material as in the main body 100 and may be integrated with the main body 100. The main body 100 and the serration part 400 may be integrated and simultaneously molded by an injection mold of a plastic material in a mold when fabricating a light spreading complex lens according to an exemplary embodiment of the present invention. Specifically, the protruding part 410 may protrude in a triangular shape as shown in FIG. 5 when viewed from the top. The protruding part 410 may satisfy Equation 1.

$$0.375 < h/p < 0.5 \quad \text{Equation 1}$$

In Equation 1, h is a length of from the second surface to an apex of the protruding part 410 and p is a length of a base line of the protruding part 410.

The protruding part 410 may have a triangular shape when viewed from the top, and thus there is a base line (p) and a height (h) from the base line to an apex. When a ratio of the height to the base line is less than or equal to about 0.375, the light may be insufficiently diffused in a right and left width direction (e.g., horizontal directions). Accordingly, the light may be insufficiently converted to a line light source. However, when the ratio is greater than about 0.5, the light may be diffused excessively, and thus, the light may be insufficiently converted to a line light source.

Figure 6:
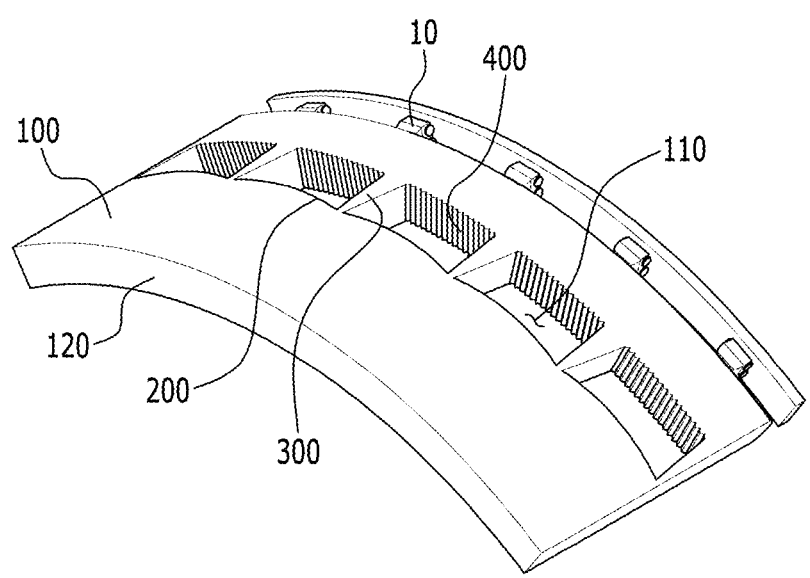
FIG. 6 is a view showing a light spreading complex lens according to an exemplary embodiment of the present invention when viewed in a side direction.

Moreover, light spreading complex lens according to an exemplary embodiment of the present invention may further include a focusing lens part 500 formed along with the rear end of the main body 100 and extending from the rear surface of the main body 100 toward the rear side. The focusing lens part 500 may be configured to focus a radiation angle of light in a vertical direction in the lens as shown in FIG. 6, which may maximize the light efficiency on a light emission surface 120. The focusing lens part 500 may maintain a predetermined distance from the point light source 10 and may have a convex lens shape.

In particular, the focusing lens part 500 may be formed of the same transparent material as in the main body 100 and may be integrated with the main body 100. The main body 100 and the focusing lens part 500 may be integrated and simultaneously molded by an injection mold of a plastic material in a mold when fabricating a light spreading complex lens according to an exemplary embodiment of the present invention. The focusing lens part 500 may protrude in a circular arc shape when viewed from the side direction. The ratio of the radius of the focusing lens part 500 to the thickness of the main body 100 may be less than about 0.6. When the main body 100 has a thickness of about 5 mm, the radius of the focusing lens part 500 may be less than about 3R. When the ratio of the radius of the focusing lens part 500 to the thickness of the main body 100 is greater than or equal to about 0.6, the radius of the focusing lens is too large to provide effects on focusing the radiation angle of light in the vertical direction.

Figure 7:
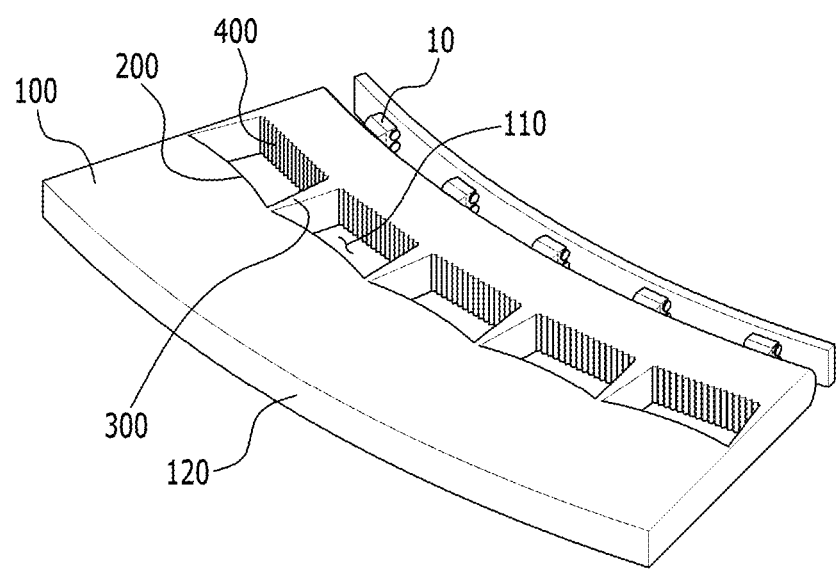
FIG. 7 is a view showing a light spreading complex lens according to an exemplary embodiment of the present invention.
Figure 8:
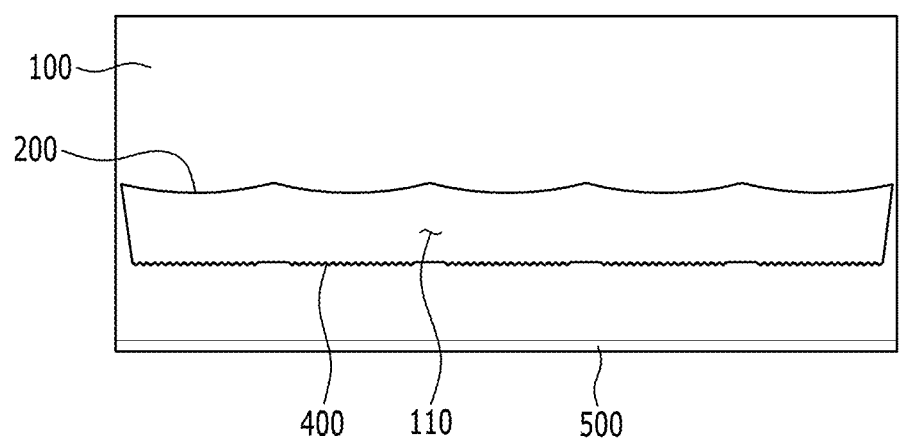
FIG. 8 is a view showing a light spreading complex lens according to an exemplary embodiment of the present invention.

As shown in FIG. 7, in the light spreading complex lens according to an exemplary embodiment of the present invention, the main body 100 may have a curved shape with both ends thereof directed toward a down-side (e.g., directed downward), and the center thereof direct toward an upside (e.g., directed upward). In other words, the center of the main body 100 may be curved upward in a convex manner. The light spreading complex lens according to the present invention may be formed in various shapes, and the light emitted from the front side of the main body may show a circular arc shape. Alternatively, as shown in FIG. 8, the main body 100 may have a shape in which a length of the front end is greater than a length of the rear end, and the rear end and the front end of the main body show a circular arc shape, based on the imaginary central point disposed in the rear side of the main body 100. In other words, the main body 100 may be formed in a partial fan shape. As in above, the light spreading complex lens according to the present invention may be formed in various shapes. The light emitted from the front side of the main body 100 may be diffused in a right and left direction (e.g., horizontal).

Figure 9:
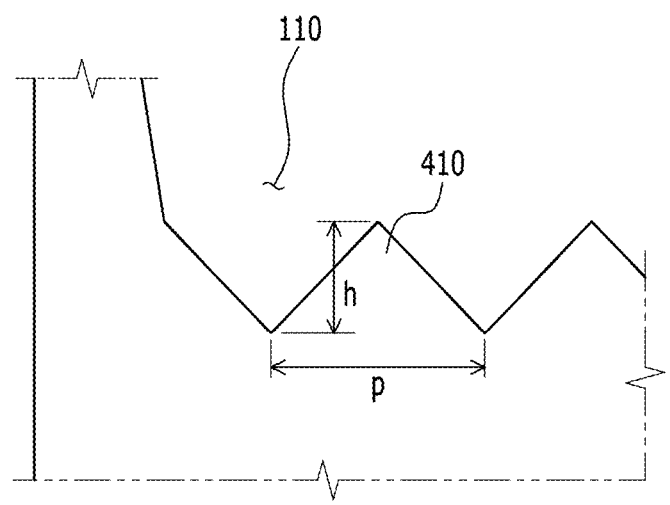
FIG. 9 is a view showing a light spreading complex lens according to an exemplary embodiment of the present invention.

Meanwhile, as shown in FIG. 9, in the light spreading complex lens according to an exemplary embodiment of the present invention, the aperture 110 formed in the main body 100 may be formed longitudinally along with a right and left width direction, and the number of refraction lens parts 200 is the same as the number of the point light sources 10, and the protruding part 410 for the serration part 400 may be set with a plurality thereof and formed in the same number as the number of the refraction lens parts 200 or the point light sources 10 and formed on the second surface. In other words, the width of the front end of the barrier rib 300 may be narrower, and thus, the barrier rib 300 may be omitted to provide a light spreading complex lens when the stiffness is sufficiently ensured.

EXAMPLES

1) Performance Evaluation According to Ratio Change of Radius of Focusing Lens Part to Thickness of Main Body As shown in Table 1, a flat light spreading complex lens formed with no focusing lens part 500 and light spreading complex lenses of which ratios of a radius of the focusing lens part 500 to a thickness of the main body 100 are 0.5, 0.6, 0.8, and 1, respectively, were prepared. Further, 15P LED was used, the main body 100 had a thickness of 5 mm, the radius of the refraction lens part 200 was 35R, and a protruding part 410 of the serration part 400 had a triangular shape with a height of 0.3 mm and a base line length of 0.7 mm. The light luminance was measured at each point by determining measurement points from one side to the other side (e.g., a first side to a second side) on the light emission surface 120 and irradiating light from LED.

TABLE 1

|  | 1 | 2 | 3 | 4 | 5 | 6 | 7 | 8 | 9 | HIGH | LOW | AVERAGE | Notes |
|---|---|---|---|---|---|---|---|---|---|---|---|---|---|
| Flat | 45690 | 46920 | 46500 | 46080 | 47970 | 45110 | 46830 | 41690 | 44060 | 46210 | 44950 | 45650 | Comparative Example |
| 0.5 | 64820 | 61850 | 61390 | 62230 | 60570 | 59960 | 61590 | 57150 | 57150 | 61352 | 60297 | 60883 | Example |
| 0.6 | 60510 | 60580 | 59340 | 62620 | 58580 | 59290 | 57240 | 55700 | 55700 | 59547 | 57946 | 58658 | Comparative Example |
| 0.8 | 52720 | 56660 | 51800 | 56900 | 50300 | 56970 | 50230 | 53180 | 53180 | 55928 | 50640 | 52990 | Comparative Example |
| 1 | 48780 | 54230 | 50060 | 55530 | 50080 | 53020 | 49020 | 50780 | 48000 | 53390 | 49188 | 51056 | Comparative Example |

Figure 10:
FIG. 10 is a view showing how brightness and uniformity are changed depending upon a measurement value at a luminance measurement position of Examples and Comparative Examples.

As illustrated in Table 1, the Example in which a ratio of a radius of the focusing lens part 500 to a thickness of the main body 100 is 0.5 had the lowest deviation of between the maximum value and the minimum value of measurement values and the highest average measurement value in other Comparative Examples. In addition, as shown in FIG. 10, it is confirmed that the Example had the most improved light uniformity.

2) Performance Evaluation According to Ratio Change of Radius of Refraction Lens Part to Thickness of Main Body As shown in Table 2, light spreading complex lenses of which ratios of a radius of the refraction lens part 200 to a thickness of the main body 100 are 3, 4, 5, 6, 7, 8, 10, and 12, respectively were prepared. Further, 15P LED was used, the main body 100 has the thickness of 5 mm, the radius of the refraction lens part 200 was 2.5R, and a protruding part 410 of the serration part 400 had a triangular shape with a height of 0.3 mm and a base line length of 0.7 mm. The light luminance was measured at each point by determining measurement points from one side to the other side on the light emission surface 120 and irradiating light from LED.

TABLE 2

|  | 1 | 2 | 3 | 4 | 5 | 6 | 7 | 8 | 9 | HIGH | LOW | AVERAGE | UNIFORMITY | Note |
|---|---|---|---|---|---|---|---|---|---|---|---|---|---|---|
| 3 | 58520 | 47410 | 56090 | 47850 | 55170 | 49860 | 55860 | 50080 | 55300 | 56188 | 48800 | 52904 | 86.9 | Comparative Example |
| 4 | 60730 | 61690 | 58950 | 62590 | 56720 | 59890 | 57710 | 58100 | 55040 | 60567 | 57830 | 59047 | 95.5 | Example |
| 5 | 59760 | 62860 | 59740 | 66490 | 57410 | 62620 | 57800 | 56950 | 53820 | 62230 | 57706 | 59717 | 92.7 | Example |
| 6 | 60030 | 61750 | 59120 | 63690 | 57960 | 60410 | 56980 | 57810 | 54240 | 60915 | 57666 | 59110 | 94.7 | Example |
| 7 | 61240 | 61660 | 58740 | 62390 | 58380 | 59070 | 56630 | 55920 | 54500 | 59760 | 57898 | 58726 | 96.9 | Example |
| 8 | 58980 | 53640 | 59450 | 55020 | 57540 | 55980 | 57700 | 55380 | 54060 | 57546 | 55005 | 56417 | 95.6 | Example |
| 10 | 60120 | 48150 | 58280 | 50050 | 57860 | 51360 | 56460 | 53120 | 53360 | 50670 | 57216 | 54307 | 88.6 | Comparative Example |
| 12 | 60820 | 45360 | 59320 | 46620 | 56940 | 49320 | 57230 | 51120 | 53340 | 48105 | 57530 | 53341 | 83.6 | Comparative Example |

Figure 11:
FIG. 11 is a view showing how brightness and uniformity are changed depending upon a measurement value at a luminance measurement position of Examples and Comparative Examples.
Figure 11:
Figure 11:
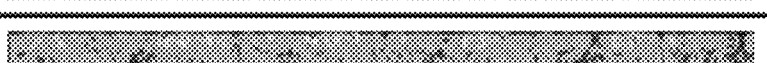
Figure 11:
Figure 11:
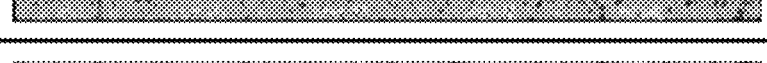
Figure 11:
Figure 11:
Figure 11:

As shown in Table 2, the Examples having the ratio of the radius of the refraction lens part 200 to the thickness of the main body 100 of 4 to 8 had lower deviations of between the maximum value and the minimum value of the measurement values and higher average measurement values than in other Comparative Examples. In addition, as in FIG. 11, it is confirmed that the light uniformity was greater than or equal to 92.7 which was superior to the Comparative Examples.

3) Performance Evaluation for Ratio Change of Width at Front End of Barrier Ribs to Thickness of Main Body As shown in Table 3, light spreading complex lenses of which ratios of a width at the front end of the barrier ribs 300 to a thickness of the main body 100 are 0.2, 0.3, 0.4, 0.5, and 0.6, respectively were prepared. Further, 15P LED was used, the main body 100 had a thickness of 5 mm, the radius of the focusing lens part 500 was 2.5R, the radius of the refraction lens part 200 was 35R, and a protruding part 410 of the serration part 400 had a triangular shape having a height of 0.3 mm and a base line length of 0.7 mm. The light luminance was measured at each point by determining measurement points from one side to the other side on the light emission surface 120 and irradiating light from LED.

TABLE 3

|  | 1 | 2 | 3 | 4 | 5 | 6 | 7 | 8 | 9 | HIGH | LOW | AVERAGE | UNIFORMITY | Note |
|---|---|---|---|---|---|---|---|---|---|---|---|---|---|---|
| 0.2 | 60870 | 63760 | 62760 | 64690 | 62880 | 62900 | 61000 | 60740 | 56660 | 63023 | 60834 | 61807 | 96.5 | Example |
| 0.3 | 47720 | 56880 | 47890 | 57870 | 46120 | 55330 | 45960 | 50030 | 44590 | 55028 | 46456 | 50266 | 84.4 | Comparative Example |
| 0.4 | 49140 | 42650 | 48160 | 42250 | 46410 | 40030 | 45790 | 37390 | 44620 | 40580 | 46824 | 44049 | 86.7 | Comparative Example |
| 0.5 | 48870 | 26410 | 47430 | 25560 | 46560 | 24250 | 45530 | 22530 | 44540 | 24688 | 46586 | 36853 | 53.0 | Comparative Example |
| 0.6 | 49590 | 11040 | 48420 | 10840 | 46630 | 9822 | 45230 | 9224 | 45330 | 10232 | 47040 | 30681 | 21.8 | Comparative Example |

Figure 12:
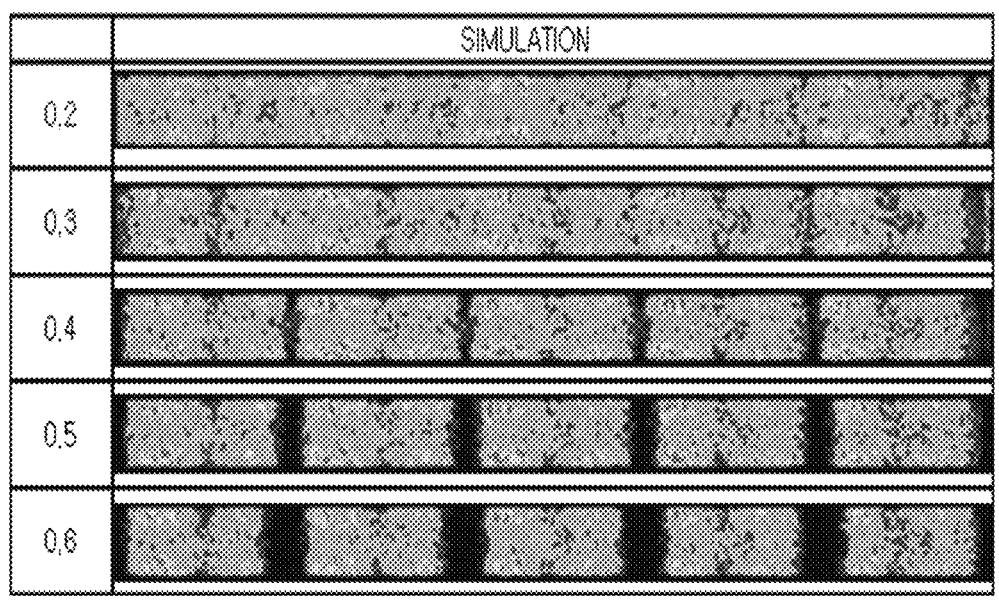
FIG. 12 is a view showing how brightness and uniformity are changed depending upon a measurement value at a luminance measurement position of Examples and Comparative Examples.

As shown in Table 3, the Example having a ratio of a width at the front end of the barrier rib 300 to a thickness of the main body 100 of 0.2 had a lower deviation of between the maximum value and the minimum value of the measurement values and a higher average measurement value than in other Comparative Examples. In addition, as shown in FIG. 12, it is confirmed that the Example had a light uniformity of 96.5 which was more improved than in Comparative Examples.

4) Performance Evaluation According to Ratio Change of Height to Length of Base Line of Protruding Part Light spreading complex lenses having a height and a length of the base line of the protruding part 410 as shown in Table 4 were prepared. The case of 0.3R was referred to Comparative Example that the protruding part 410 had a circular arc shape instead of the triangular shape. Further, 15P LED was used, the main body 100 had a thickness of 5 mm, the radius of the focusing lens part 500 was 2.5R, and the radius of the refraction lens part 200 was 35R. The light luminance was measured at each point by determining measurement points from one side to the other side on the light emission surface 120 and irradiating light from LED.

TABLE 4

| h/p | 1 | 2 | 3 | 4 | 5 | 6 | 7 | 8 | 9 | HIGH | LOW | AVERAGE | UNIFORMITY | Note |
|---|---|---|---|---|---|---|---|---|---|---|---|---|---|---|
| 0.3/0.6 | 49680 | 70960 | 47850 | 74890 | 46320 | 71050 | 46790 | 65830 | 44220 | 70682 | 46972 | 58827.3 | 66.5 | Comparative Example |
| 0.3/0.7 | 60870 | 63760 | 62760 | 64690 | 62880 | 62900 | 61000 | 60740 | 56660 | 63023 | 60834 | 61807 | 96.5 | Example |
| 0.3/0.8 | 66960 | 55220 | 67090 | 54050 | 66550 | 54150 | 64790 | 52400 | 62260 | 53955 | 65530 | 60386 | 82.3 | Comparative Example |
| 0.3/0.9 | 70320 | 48800 | 71890 | 48970 | 70500 | 47590 | 68730 | 46830 | 65020 | 48048 | 69292 | 59850 | 69.3 | Comparative Example |
| 0.3/1 | 72020 | 44920 | 74180 | 44550 | 74090 | 44260 | 73770 | 45340 | 69730 | 44768 | 72758 | 60318 | 61.5 | Comparative Example |
| 0.5/1 | 50060 | 70270 | 48390 | 73300 | 47710 | 70270 | 47970 | 65430 | 46600 | 69817 | 48146 | 58981 | 69.0 | Comparative Example |

TABLE 4-continued

| h/p | 1 | 2 | 3 | 4 | 5 | 6 | 7 | 8 | 9 | HIGH | LOW | AVERAGE | UNIFORMITY | Note |
|---|---|---|---|---|---|---|---|---|---|---|---|---|---|---|
| 1/2 | 56510 | 76570 | 54190 | 80950 | 53380 | 78270 | 51880 | 74620 | 52400 | 77602 | 53672 | 65637 | 69.2 | Comparative Example |
| 0.3R | 71040 | 28860 | 74870 | 28950 | 73960 | 32000 | 71530 | 35090 | 66960 | 71672 | 31225 | 53696 | 44 | Comparative Example |

Figure 13:
FIG. 13 is a view showing how brightness and uniformity are changed depending upon a measurement value at a luminance measurement position of Examples and Comparative Examples.
Figure 14:
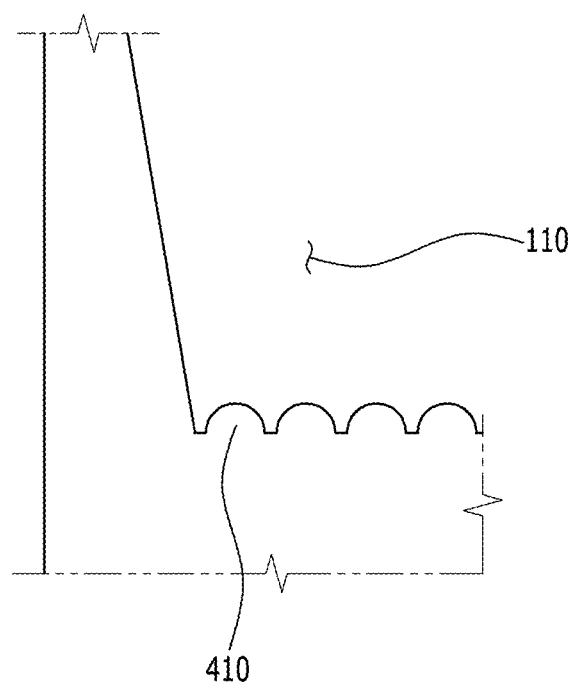
FIG. 14 shows a circular arc-shaped serration part of a light spreading complex lens according to an exemplary embodiment of the present invention.

As shown in Table 4, the Example that a ratio of the height to the length of the base line of the protruding part 410 is about 0.43 had a lower deviation between the maximum value and the minimum value of the measurement values and a higher average measurement value than in other Comparative Examples. In addition, as shown in FIG. 13, it is confirmed that the Example had the light uniformity of 96.5 which was more improved than in Comparative Examples. In addition, as in FIG. 14, it is confirmed that Example had superior performances than in Comparative Example in which the protruding part 410 was formed in a circular arc shape.

While this invention has been described in connection with what is presently considered to be practical exemplary embodiments, it is to be understood that the invention is not limited to the disclosed exemplary embodiments and/or examples, but, on the contrary, is intended to cover various modifications and equivalent arrangements included within the spirit and scope of the appended claims. Therefore, the aforementioned exemplary embodiments and/or examples should be understood to be exemplary but not limiting the present invention in any way.

DESCRIPTION OF SYMBOLS

10: point light source
100: main body
110: aperture
200: refraction lens part
300: barrier rib
400: serration part
410: protruding part
500: focusing lens part

What is claimed is:

1. A light spreading complex lens though which light is irradiated and transmitted from a rear side toward a front side, comprising:
a main body having a predetermined thickness and formed with an aperture penetrated in a vertical direction;
a refraction lens part that protrudes toward the rear side of the lens from a first surface proximate to the front side of the lens in the inner surfaces of the aperture; and
a serration part including a plurality of protruding parts that protrude toward the front side of the lens from a second surface proximate to the rear side of the lens in the inner surfaces of the aperture,
wherein the protruding part protrudes in a triangular shape when viewed from a top direction, and
wherein the protruding part satisfies:

$0.375 < h/p < 0.5$ wherein, h is a length of from the second surface to an apex of the protruding part and p is a length of a base line of the protruding part.

2. The light spreading complex lens of claim 1, wherein a plurality of apertures are arranged from a first side to a second side of the main body, and a barrier rib is disposed between any one aperture among the plurality of apertures and an adjacent aperture.

3. The light spreading complex lens of claim 2, wherein the barrier rib has a width that gradually decreases toward the front side.

4. The light spreading complex lens of claim 3, wherein a ratio of the width at a front end of the barrier rib to a thickness of the main body is less than about 0.3.

5. The light spreading complex lens of claim 1, further comprising:
a focusing lens part formed along a rear end of the main body and that protrudes toward the rear side of the lens from the rear surface of the main body.

6. The light spreading complex lens of claim 5, wherein the focusing lens part protrudes in a circular arc shape when viewed from a side direction.

7. The light spreading complex lens of claim 6, wherein a ratio of a radius of the focusing lens part to a thickness of the main body is less than about 0.6.

8. The light spreading complex lens of claim 1, wherein the refraction lens part protrudes in a circular arc shape when viewed from a top direction.

9. The light spreading complex lens of claim 8, wherein a ratio of a radius of the refraction lens part to a thickness of the main body is greater than about 3 and less than about 10.

10. The light spreading complex lens of claim 1, wherein the main body has a curved shape with both ends directed downward, and a center directed upward.

11. The light spreading complex lens of claim 1, wherein a length of the front end of the main body is greater than a length of the rear end, and the rear end and the front end of the main body are formed in a circular arc shape based on an imaginary central point disposed on the rear side of the main body.

* * * * *